US012572775B2

(12) United States Patent
Konishi et al.

(10) Patent No.: US 12,572,775 B2
(45) Date of Patent: Mar. 10, 2026

(54) METHOD AND INFORMATION PROCESSING APPARATUS FOR PERFORMING TRANSFER LEARNING WHILE SUPPRESSING OCCURRENCE OF CATASTROPHIC FORGETTING

(71) Applicants: KDDI Research, Inc., Fujimino (JP); THE BOARD OF TRUSTEES OF THE UNIVERSITY OF ILLINOIS, Urbana, IL (US)

(72) Inventors: Tatsuya Konishi, Fujimino (JP); Mori Kurokawa, Fujimino (JP); Bing Liu, Winnetka, IL (US); Gyuhak Kim, Chicago, IL (US); Zixuan Ke, Chicago, IL (US)

(73) Assignees: KDDI Research, Inc., Fujimino (JP); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 744 days.

(21) Appl. No.: 17/939,215

(22) Filed: Sep. 7, 2022

(65) Prior Publication Data

US 2024/0086678 A1     Mar. 14, 2024

(51) Int. Cl.
*G06N 3/04* (2023.01)
*G06N 3/08* (2023.01)

(52) U.S. Cl.
CPC ................ *G06N 3/04* (2013.01); *G06N 3/08* (2013.01)

(58) Field of Classification Search
CPC .................................. G06N 3/04; G06N 3/08
USPC .......................................................... 706/15
See application file for complete search history.

(56) References Cited

U.S. PATENT DOCUMENTS

| 11,755,916 B2 * | 9/2023 | Cao ........................ G06N 3/084 |
| | | 706/15 |
| 12,182,702 B2 * | 12/2024 | Konishi ................. G06N 3/084 |

OTHER PUBLICATIONS

Joan Serrà et al., "Overcoming Catastrophic Forgetting with Hard Attention to the Task," Proc. of ICML, 2018, 17 pages.

* cited by examiner

*Primary Examiner* — April Y Blair
(74) *Attorney, Agent, or Firm* — Foley & Lardner LLP

(57) ABSTRACT

The neural network includes layers, and the layers each include a plurality of units, the plurality of units each have a weight coefficient associated with each input to a unit, and an importance parameter indicating importance of the weight coefficient. The method includes: in learning of a task, adjusting a first weight coefficient based on the importance parameter of the first weight coefficient and a first gradient of the first weight coefficient determined using a training set; and after the learning has been completed, determining, based on the training set, respective second gradients of a plurality of second weight coefficients included in a first layer including the first weight coefficient, and calculating the importance parameter of the first weight coefficient to be used in learning of a next task based on the respective second gradients.

8 Claims, 5 Drawing Sheets

1

1

F I G.  6

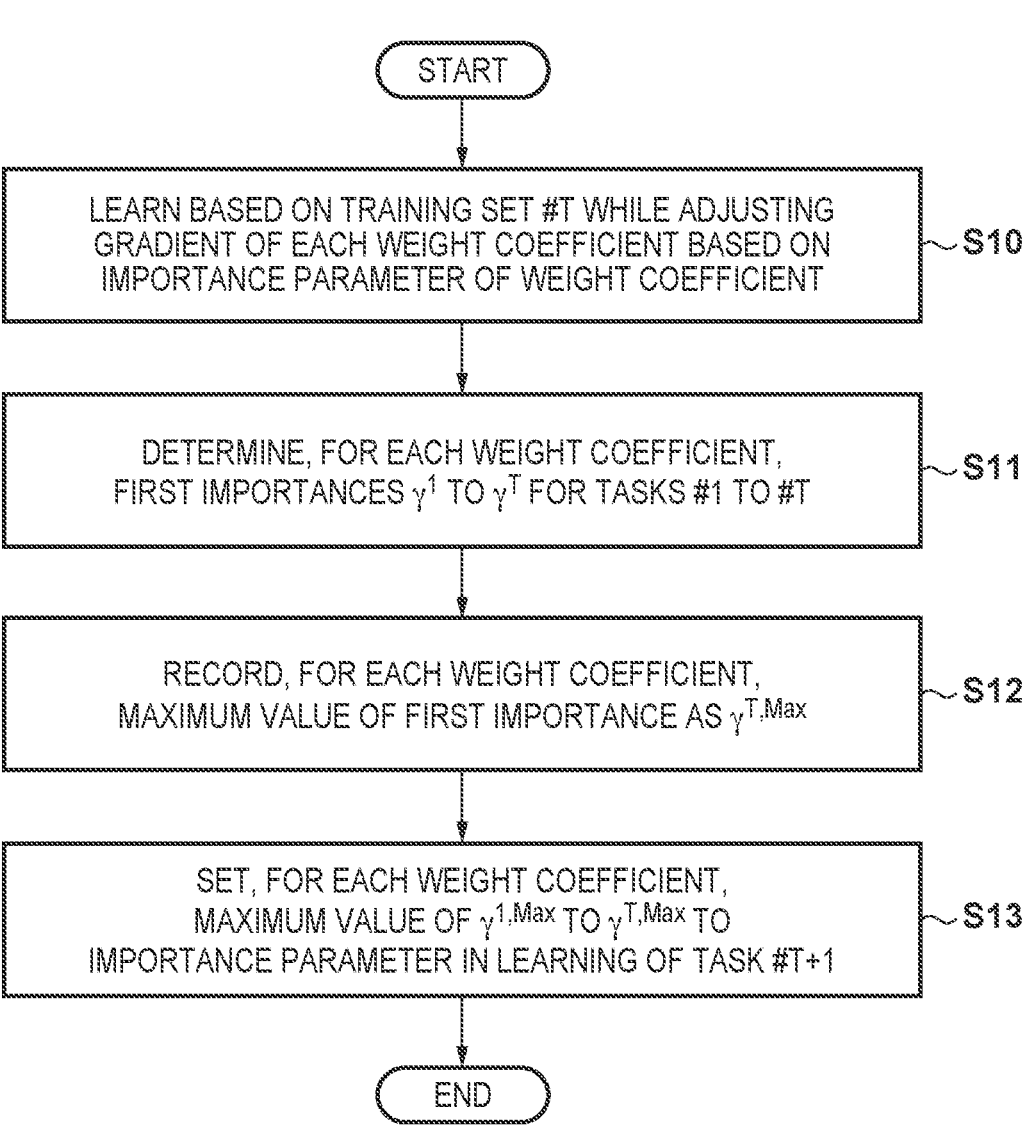

START

LEARN BASED ON TRAINING SET #T WHILE ADJUSTING
GRADIENT OF EACH WEIGHT COEFFICIENT BASED ON
IMPORTANCE PARAMETER OF WEIGHT COEFFICIENT — S10

DETERMINE, FOR EACH WEIGHT COEFFICIENT,
FIRST IMPORTANCES $\gamma^1$ TO $\gamma^T$ FOR TASKS #1 TO #T — S11

RECORD, FOR EACH WEIGHT COEFFICIENT,
MAXIMUM VALUE OF FIRST IMPORTANCE AS $\gamma^{T,Max}$ — S12

SET, FOR EACH WEIGHT COEFFICIENT,
MAXIMUM VALUE OF $\gamma^{1,Max}$ TO $\gamma^{T,Max}$ TO
IMPORTANCE PARAMETER IN LEARNING OF TASK #T+1 — S13

END

METHOD AND INFORMATION PROCESSING APPARATUS FOR PERFORMING TRANSFER LEARNING WHILE SUPPRESSING OCCURRENCE OF CATASTROPHIC FORGETTING

BACKGROUND

Field of the Disclosure

The present disclosure relates to deep learning technology, and specifically relates to a technique for performing transfer learning while suppressing the occurrence of catastrophic forgetting.

Description of the Related Art

For example, various types of processing, such as image recognition, document classification, behavior recognition, and behavior prediction, are being performed using neural networks. A neural network is formed by connecting a plurality of layers, and each layer includes one or more units. The units may also be referred to as neurons. An input value inputted to the neural network is inputted to each unit in the first layer. To each unit in the remaining layers, output values of the one or more units in the previous layer are inputted as input values. Each unit has weight coefficients corresponding to the respective input values inputted thereto. Each unit multiplies the input values by the corresponding weight coefficients, and calculates an output value based on a sum of the values obtained through multiplication by the weight coefficients. The weight coefficients corresponding to the input values of each unit may also be simply called parameters. However, the term "weight coefficient(s)" is used in the present disclosure. Each unit in a layer other than the final layer outputs the output value thereof to the one or more units in the subsequent layer. The output values of the units in the final layer serve as the output values of the neural network. Note that branching may be provided subsequent to the units in the final layer and the output values of the units in the final layer may be outputted to each of a plurality of heads, in which case the output from each head can be used as an output value of the neural network. Each head may include one or more layers.

In order to use the neural network for various tasks, learning is performed, for example. Learning is processing in which a set of training data (referred to hereinafter as "training set") corresponding to a task is used to optimize the weight coefficients of each unit for the task. For example, for a task of recognizing target objects A, B, and C from images, a training set including many images of the target objects A, B, and C is prepared. Then, image data of the images in the training set is sequentially input to the neural network, and output values of the neural network are calculated (forward propagation). Errors in these output values are assessed based on a predetermined error function (may also be referred to as a loss function). Furthermore, based on so-called backpropagation, error amounts of units are calculated in order from the units in the final layer, and "gradients" of the weight coefficients of each unit are calculated from the error amount of the unit. Each weight coefficient is changed/adjusted based on the corresponding gradient (backward propagation). The weight coefficients of each unit are optimized for the task by using the training set and repeating forward propagation and backward propagation subsequent thereto.

In deep learning, a phenomenon called catastrophic forgetting is known. For example, when taking image recognition as an example, catastrophic forgetting is a phenomenon in which, when a neural network that can identify target objects A, B, and C based on a given training set is trained using another training set that includes images of target objects D and E so that the neural network can further recognize the target objects D and E, the accuracy with which the target objects A, B, and C are identified decreases.

The document "Overcoming Catastrophic Forgetting with Hard Attention to the Task" (Joan Serrà, Dídac Surís, Marius Miron and Alexandros Karatzoglou, In Proc. of ICML, 2018) (referred to hereinafter as the "HAT technique") discloses a technique for suppressing catastrophic forgetting.

Specifically, in the HAT technique, catastrophic forgetting is suppressed by stopping weight coefficients that are important for a previously-learned task (for example, the task of identifying the target objects A, B, and C) from being updated in the learning of a new task (for example, the task of identifying the target objects D and E).

On the other hand, so-called transfer learning, in which performance of a task that is being newly learned is improved by transferring knowledge regarding a previously-learned task to the task that is being newly learned, is attracting attention.

Here, transfer learning may be inhibited if weight coefficients that are important for a previously-learned task are stopped from being updated as disclosed by the HAT technique.

SUMMARY

The present disclosure provides a technique for performing transfer learning while suppressing the occurrence of catastrophic forgetting.

According to an aspect of the present disclosure, a method to be executed by an information processing apparatus to cause a neural network having sequentially learned first to (T–1)-th tasks (where T is an integer of two or more) sequentially using first to (T–1)-th training sets to learn a T-th task using a T-th training set, wherein the neural network includes a plurality of layers, and the plurality of layers each include a plurality of units, the plurality of units each have a weight coefficient associated with each input to a unit, and an importance parameter indicating importance of the weight coefficient, and the method comprises: in learning of the T-th task, adjusting a first weight coefficient based on the importance parameter of the first weight coefficient and a first gradient of the first weight coefficient determined using the T-th training set; and after the learning with the T-th training set has been completed, determining, based on the T-th training set, respective second gradients of a plurality of second weight coefficients included in a first layer including the first weight coefficient among the plurality of layers, wherein the plurality of second weight coefficients include the first weight coefficient, and calculating the importance parameter of the first weight coefficient to be used in learning of a (T+1)-th task based on the respective second gradients of the plurality of second weight coefficients.

Further features of the present disclosure will become apparent from the following description of exemplary embodiments with reference to the attached drawings.

BRIEF DESCRIPTION OF THE DRAWINGS

FIG. 6 is a flowchart of learning processing executed by a learning unit.

DESCRIPTION OF THE EXEMPLARY EMBODIMENTS

Figure 1:
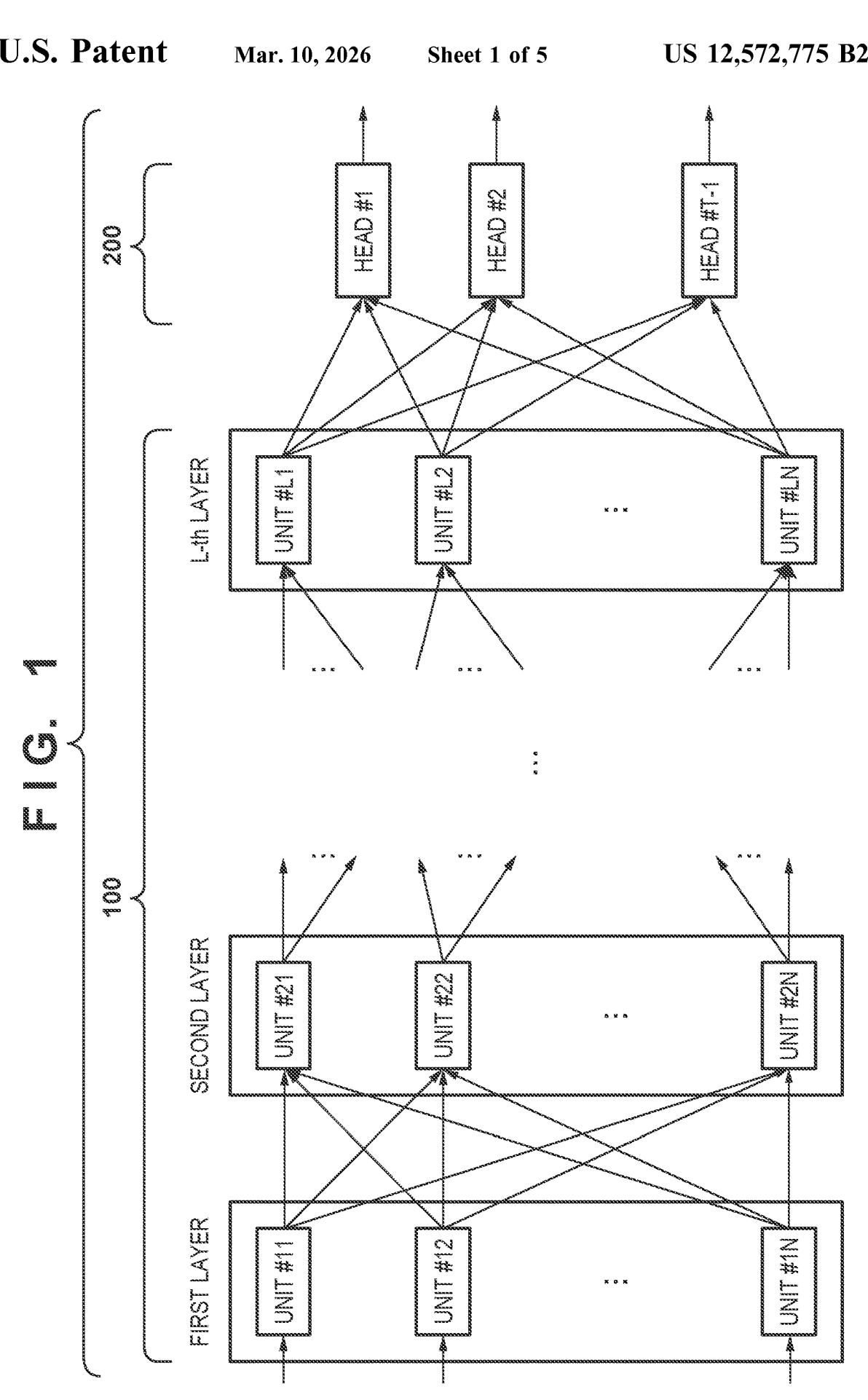
FIG. 1 is a configuration diagram of an exemplary neural network that is used to describe the present disclosure.

Hereinafter, exemplary embodiments will be described in detail with reference to the attached drawings. Other embodiments are contemplated as well, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a configuration diagram of a neural network that is used to describe the present embodiment. Note that FIG. 1 illustrates a configuration of the neural network after a total of T−1 tasks from task #1 to task #T−1 (where T is an integer of two or more) have been learned. The neural network includes a layer part 100 and a head part 200. The head part 200 includes heads that are provided so as to correspond to the respective previously-learned tasks, and thus, the head part 200 includes a total of T−1 heads from head #1 to head #T−1. Head #t (where t is an integer from 1 to T−1) corresponds to task #t.

The layer part 100 includes a total of L layers from the first layer to an L-th layer (where L is an integer of three or more). In the present embodiment, each layer includes N units (where N is an integer of two or more). In the following, an n-th unit (where n is an integer from n to 1-N) in an l-th layer (where l is an integer from 1 to L) is referred to as "unit # ln". An input value inputted to the neural network is inputted to each unit in the first layer. Output values of all units in the previous layer are inputted to each unit in the second to L-th layers. The output value of each unit in the L-th layer is outputted to each of heads #1 to #T−1 in the head part 200. Heads #1 to #T−1 may each have the same configuration as the layer part 100. However, the number of layers and the number of units in one layer may be different from those in the layer part 100. The outputs of heads #1 to #T−1 serve as outputs of the neural network.

Note that the neural network in FIG. 1 is an example, and the neural network configuration is not limited to that illustrated in FIG. 1. For example, the output from each unit in the first to (L−1)-th layers may be input only to some of the units in the subsequent layer. Furthermore, the number of units in each layer does not need to be the same. Furthermore, while the head part 200 including heads corresponding to the respective tasks is provided in the neural network according to the present exemplary embodiment, the head part 200 is an optional component.

As described above, the neural network in FIG. 1 has been trained using T−1 training sets. In the following description, a training set that was used to learn task #t is referred to as training set #t.

In one exemplary embodiment, task #1 is a task of recognizing target objects A1, A2, and A3 from images, and task #2 is a task of recognizing target objects B1 and B2, which are different from the target objects A1, A2, and A3, from images, for example. Similarly, tasks #3 to #T−1 are tasks of recognizing predetermined target objects from images. Note that the processing performed by the neural network is not limited to image recognition. Other suitable processes, which may be various types and/or combinations of processes can include, for example document classification, behavior recognition, and behavior prediction to name a few.

In the following, the present disclosure will be described taking as an example a case in which new task #T is learned using training set #T. Note that each weight coefficient in the layer part 100 and the head part 200 upon commencement of the learning of task #T is set to a value thereof at the point when the learning of task #T−1 was completed. Furthermore, head #T is added to the head part 200 to learn task #T. The initial value of each weight coefficient of head #T upon commencement of the learning of task #T can be set according to any method.

As is the case in ordinary learning, the learning of task #T includes: sequentially inputting data of one or more training set #T to the neural network and calculating output values of the neural network (forward propagation); and updating the weight coefficients of each unit based on the output values of the neural network (backward propagation). Note that, since the units operate in a manner similar to one another in forward propagation and backward propagation, the operation of unit # ln will be described in the following. Note that the same operation can apply also to the units in each head in the head part 200.

Figure 2:
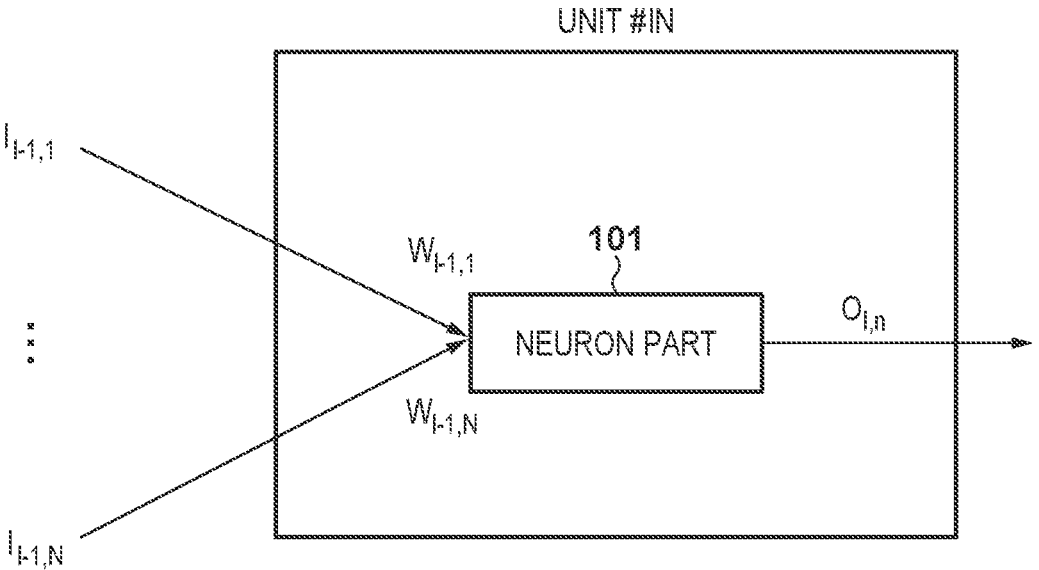
FIG. 2 is a functional block diagram of one unit during forward propagation.

FIG. 2 is a functional block diagram for describing the operation of unit # ln during forward propagation. Input values $I_{l-1,1}$ to $I_{l-1,N}$ are inputted to a neuron part 101 from units #(l−1)1 to #(l−1)N in an (l−1)-th layer. The neuron part 101 has weight coefficients $W_{l-1,1}$ to $W_{l-1,N}$ respectively corresponding to the input values $I_{l-1,1}$ to $I_{l-1,N}$, and calculates an output value $O_{l,n}$ by multiplying the input values $I_{l-1,1}$ to $I_{l-1,N}$ by the corresponding weight coefficients and adding the products together. The output value $O_{l,n}$ is output to units #(l+1)1 to #(l+1)N or to heads #1 to #T.

Figure 3:
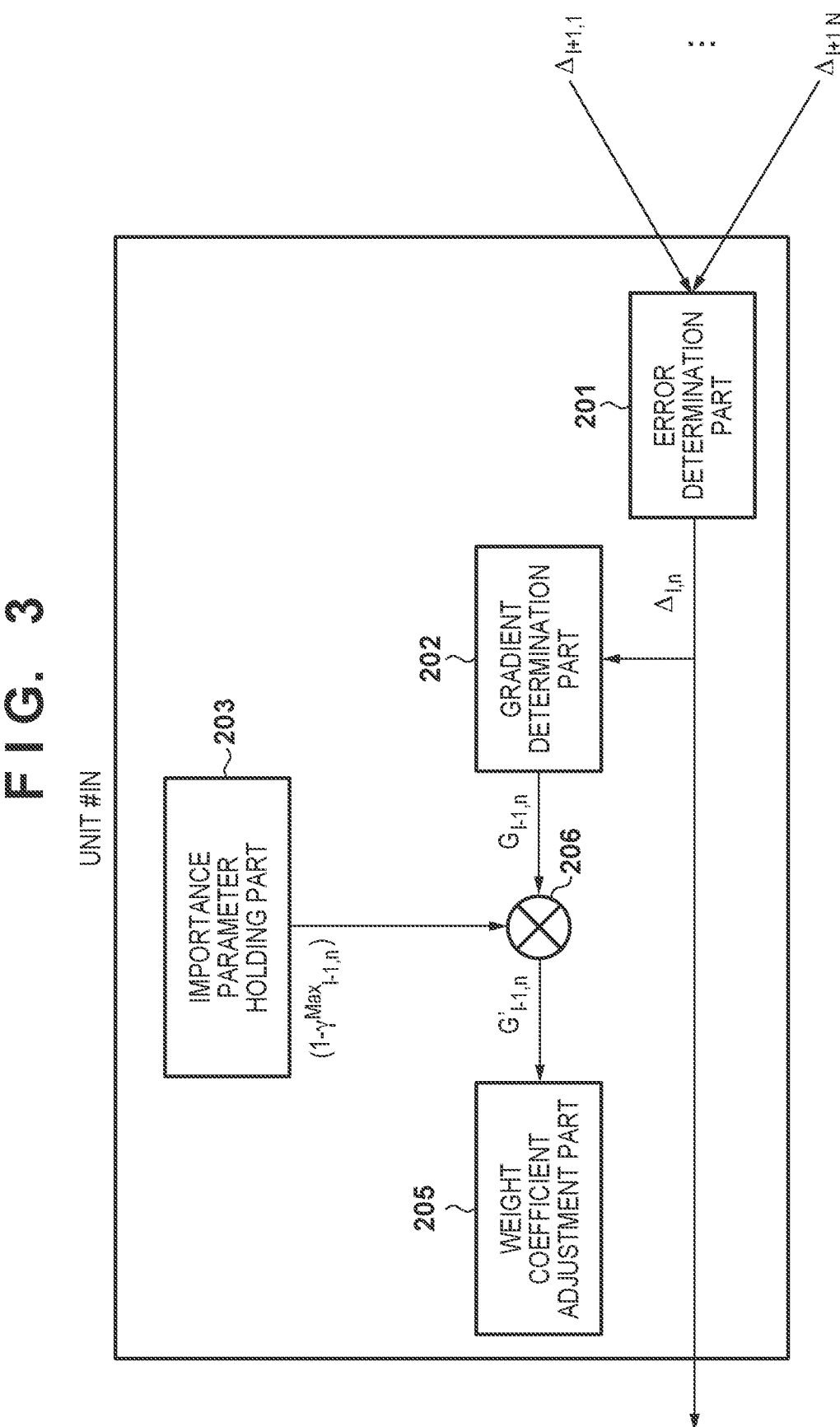
FIG. 3 is a functional block diagram of one unit during backward propagation.

FIG. 3 is a functional block diagram for describing the operation of unit # ln during backward propagation. From units #(l+1)1 to #(l+1)N, error amounts $\Delta_{l+1,1}$ to $\Delta_{l+1,N}$ are respectively inputted to an error determination part 201. The error determination part 201 calculates an error amount $\Delta_{l,n}$ of unit # ln based on the inputted error amounts. The error amount $\Delta_{l,n}$ of unit # ln is outputted to units #(l−1)1 to #(l−1)N. This processing is similar to that in ordinary backpropagation.

A gradient determination part 202 determines a gradient $G_{l-1,n}$ of each weight coefficient $W_{l-1,n}$ held by the neuron part 101 based on the error amount $\Delta_{l,n}$ of the unit # ln. This processing is also similar to that in ordinary backpropagation.

An importance parameter holding part 203 holds an importance parameter $\gamma^{Max}_{l-1,n}$ associated with each weight coefficient $W_{l-1,n}$ held by the neuron part 101. The importance parameter $\gamma^{Max}_{l-1,n}$ is a value that is no smaller than zero and smaller than one, and the more important the weight coefficient $W_{l-1,n}$ associated therewith is in previous tasks (tasks #1 to #T−1), the greater the value of the importance parameter $\gamma^{Max}_{l-1,n}$ is. The calculation of the importance parameter $\gamma^{Max}_{l-1,n}$ will be described later.

A multiplication part 206 outputs a value obtained by multiplying the gradient $G_{l-1,n}$ of each weight coefficient $W_{l-1,n}$ by $(1-\gamma^{Max}_{l-1,n})$ to a weight coefficient adjustment part 205 as an updated gradient $G'_{l-1,n}$ of the weight coefficient $W_{l-1,n}$. The weight coefficient adjustment part 205 updates the weight coefficient $W_{l-1,n}$ based on the gradient $G'_{l-1,n}$.

As described above, the more important a weight coefficient $W_{l-1,n}$ is in previous tasks (tasks #1 to #T−1), the greater the value of the importance parameter $\gamma^{Max}_{l-1,n}$ is. Thus, the more important a weight coefficient $W_{l-1,n}$ is in previous tasks, the smaller the value of $(1-\gamma^{Max}_{l-1,n})$ is. Accordingly, the more important a weight coefficient $W_{l-1,n}$ is in previous tasks, the smaller the updated gradient $G'_{l-1,n}$ is, and the weight coefficient $W_{l-1,n}$ is suppressed from being updated. Thus, the occurrence of catastrophic forgetting can be suppressed.

Furthermore, in the HAT technique, weight coefficients that are important in previously-learned tasks are stopped from being updated. Thus, each time a new task is learned, the ratio of weight coefficients that are not updated to the total number of weight coefficients increases, and thus the expressive power of the neural network with respect to new tasks decreases. In contrast, the importance parameter $\gamma^{Max}_{l-1,n}$ according to the present embodiment is smaller than one, and thus the value of $(1-\gamma^{Max}_{l-1,n})$ is greater than zero. Accordingly, each weight coefficient is updated also in the learning of a new task, and the expressive power of the neural network can be suppressed from decreasing.

In the learning of task #T, the forward propagation and backward propagation described above are repeated by an information processing apparatus. Note that a predetermined number of times may be set as the number of repetitions. Alternatively, the number of repetitions may be the number of times it takes until loss values and the weight coefficients of units converge.

Once the learning of task #T is completed, the information processing apparatus calculates importance parameters $\gamma^{Max}_{l-1,n}$ to be used in the learning of task #T+1.

In the following, the calculation of the importance parameters $\gamma^{Max}_{l-1,n}$ to be used in the learning of task #T+1 will be described. Note that the method for calculating an importance parameter associated with one weight coefficient similarly applies to all weight coefficients in the neural network. Thus, in the following, a method for calculating an importance parameter to be used in the learning of task #T+1 for one weight coefficient at the point when the learning of task #T has been completed will be described. In the following, for notational simplification, the weight coefficient being described will be indicated by W, and the importance parameter that is calculated will be indicated by $\gamma^{Max}$.

Furthermore, in the following description, the layer part 100 and head #t are regarded as one function and will be referred to as a function $f^t$. In other words, the function $f^t$ is a function for calculating an output value to be outputted by head #t when the values inputted to the layer part 100 are provided as arguments. Note that, while description thereof is omitted, the method for calculating importance parameters associated with the weight coefficients of the units in each head is also similar.

A first importance $\gamma^t$ of the weight coefficient W for task #t at the point when the learning of task #T has been completed can be calculated using the formula below.

$$\gamma^t = \left| \tanh\left( Norm\left( \frac{\partial L(f^t(x^T), y^T)}{\partial W} \right) \right) \right| \qquad (1)$$

In formula (1), L is an error function, $x^T$ is input data of training set #T, and $y^T$ is correct-answer data corresponding to the input data $x^T$. In formula (1), the argument of the function Norm is the gradient of the weight coefficient W. The function Norm is used to prevent the absolute value of the argument of the function tanh from becoming infinitely large, and the function below can be used, for example.

$$Norm(p) = \frac{p - \text{mean}(p)}{\sqrt{\text{var}(p) + \epsilon}} \qquad (2)$$

In formula (2), mean(p) is the average of p, var(p) is the variance of p, and $\epsilon$ is a very small predetermined value for preventing the absolute value of the argument of the function tanh from becoming infinitely large.

Note that the calculation of the first importance $\gamma^t$ is carried out in the unit of a layer. Specifically, if the weight coefficient W corresponds to a unit in the l-th layer, the average and variance used to calculate the function Norm correspond to the weight coefficients of the N units in the l-th layer. Note that, in the present example, because the N number of units in one layer are each associated with N weight coefficients, the number of weight coefficients from which the average and variance are calculated is $N^2$.

In formula (1), the function tanh is for normalizing the gradient of the weight coefficient W to a value that is no smaller than zero and smaller than one.

The information processing apparatus respectively calculates first importances $\gamma^1$ to $\gamma^T$ for tasks #1 to #T, and records the maximum value among the first importances $\gamma^1$ to $\gamma^T$ as $\gamma^{T,Max}$. Thus, at the point when the learning of task #T has been completed, the information processing apparatus has recorded via a storage device operatively connected to or incorporated therein a total of T maximum values from maximum value $\gamma^{1,Max}$ to maximum value $\gamma^{T,Max}$. The information processing apparatus sets the maximum value among the maximum values $\gamma^{1,Max}$ to $\gamma^{T,Max}$ as the importance parameter $\gamma^{Max}$ of the weight coefficient W to be used in the learning of task #T+1.

Note that the importance parameter of the weight coefficient W used for task #T is the maximum value among the maximum values $\gamma^{1,Max}$ to $\gamma^{T-1,Max}$. Thus, the information processing apparatus can set the greater one of the maximum value $\gamma^{T,Max}$ and the importance parameter of the weight coefficient W used for task #T as the importance parameter $\gamma^{Max}$ of the weight coefficient W to be used in the learning of task #T+1. In this case, the information processing apparatus does not need to record the previous maximum values $\gamma^{1,Max}$ to $\gamma^{T,Max}$, and it suffices for the information processing apparatus to only record the latest importance parameter that was calculated at the point when learning processing was completed and will be used in the subsequent learning processing.

The importance parameter $\gamma^{Max}$ of the weight coefficient W is the maximum value among the importances of the weight coefficient W in tasks #1 to #T. In the present embodiment, the updating of the weight coefficient W in the learning of task #T+1 is suppressed in accordance with this importance. Specifically, the higher the importance in at least one of tasks #1 to #T is, the smaller the update amount of the weight coefficient W in the learning of task #T+1 is.

This configuration reduces the update amount of a weight coefficient W that is important in a previous task, and suppresses the occurrence of catastrophic forgetting.

Note that, in the HAT technique, the update amount of a weight coefficient W that is important in a previous task is set to substantially zero, and the weight coefficient W is thus not updated in the learning of task #T+1, resulting in efficient transfer of knowledge (transfer learning) being inhibited.

In contrast, the value of the importance parameter $\gamma^{Max}$ according to the present embodiment continuously changes within the range of no smaller than zero and smaller than one in accordance with the importance of the weight coefficient W. Accordingly, the weight coefficient W is also updated in the learning of task #T+1, resulting in transfer of knowledge (transfer learning) being promoted. In fact, because even a weight coefficient W that is important in a previous task is updated in accordance with the importance thereof in the present embodiment, the present embodiment has an advantage in that there is a possibility of so-called backward transfer, in which the performance of previous tasks is improved by task #T+1 being learned, occurring.

Figure 4:
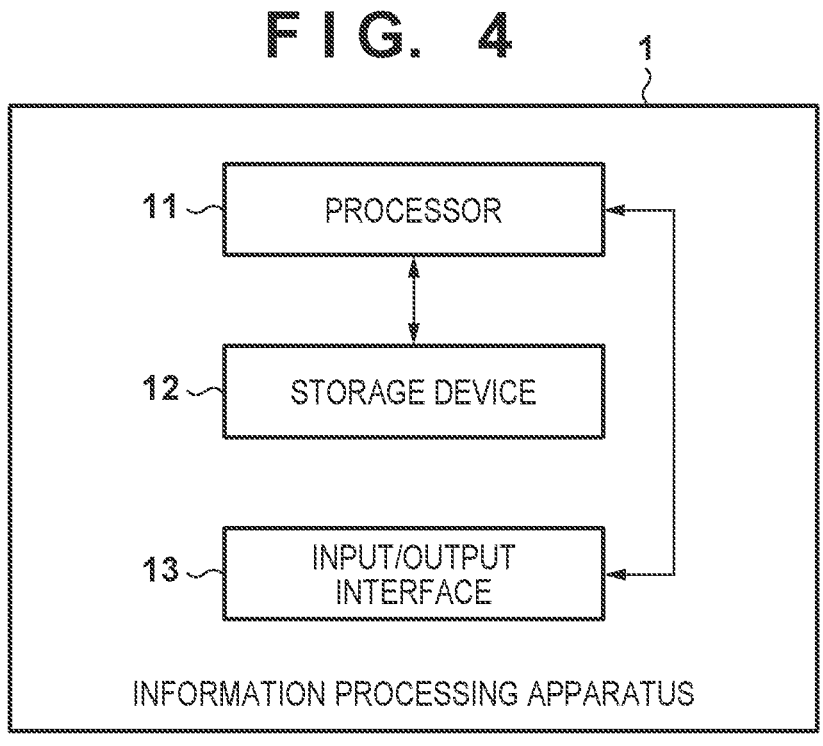
FIG. 4 is a diagram illustrating a hardware configuration of an information processing apparatus.
Figure 5:
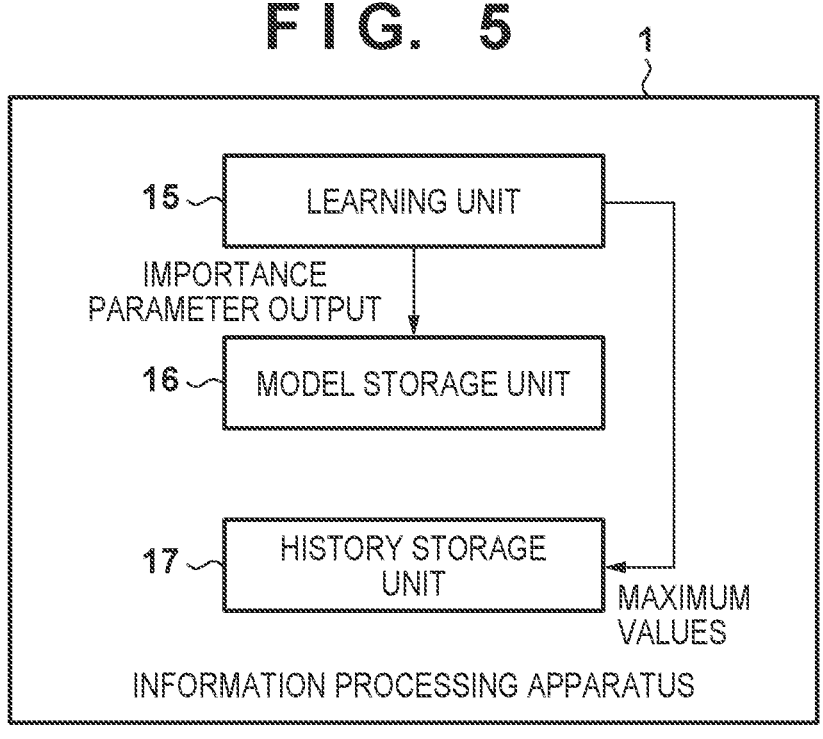
FIG. 5 is a functional block diagram of the information processing apparatus.

FIG. 4 is an exemplary hardware configuration diagram of an information processing apparatus 1 according to the present embodiment. The information processing apparatus 1 can include a number of system components, such as one or more processors 11, a storage device 12 including volatile and/or non-volatile memories, and input/output interfaces 13 such as a keyboard, a mouse, and a display. The components of the information processing apparatus 1 of the system can be directly, indirectly or operatively connected to one another, as desired for a particular embodiment. The functional blocks illustrated in FIG. 5 are realized by the one or more processors 11 executing a program stored, downloaded or streamed into the storage device(s) 12.

In the following, the functional blocks of the information processing apparatus 1 illustrated in FIG. 5 will be described. A model storage unit 16 has model information stored therein. The model information can include information such as the weight coefficients of each unit in the plurality of layers of the layer part 100, and the connections between units, for example. Furthermore, the model information can include information such as the number of heads in the head part 200, and the weight coefficients of each unit in the one or more layers in each head. For example, at the point when the learning of task #T−1 has been completed, a history storage unit 17 has stored therein, for each weight coefficient, maximum values $\gamma^{1,Max}$ to $\gamma^{T-1,Max}$.

In the learning of task #T, a learning unit 15 performs the learning of task #T by repeating the above-described forward propagation and backward propagation. Furthermore, once the learning of task #T has been completed, the learning unit 15, for each weight coefficient, calculates the importance parameter $\gamma^{Max}$ to be used in the learning of task #T+1 as described above, and stores the importance parameter $\gamma^{Max}$ to the model storage unit 16.

FIG. 6 is a flowchart of processing executed by the learning unit 15 during the learning of task #T. In step S10, the learning unit 15 performs learning based on training set #T while adjusting the gradient of each weight coefficient based on the importance parameter of the weight coefficient.

Once the learning based on training set #T is completed, the learning unit 15 calculates, for each weight coefficient, first importances $\gamma^1$ to $\gamma^T$ for tasks #1 to #T, respectively, in step S11, and calculates, for each weight coefficient, the maximum value $\gamma^{T,Max}$ of the first importances and stores the maximum value $\gamma^{T,Max}$ to the history storage unit 17 in step S12.

In step S13, for each weight coefficient, the learning unit 15 determines the maximum value among the maximum values $\gamma^{1,Max}$ to $\gamma^{T,Max}$ stored in the history storage unit 17, and sets the determined maximum value as the importance parameter to be used in the learning of task #T+1. The importance parameter is set to the model storage unit 16.

Note that the program realizing the functions of the information processing apparatus may be distributed by being stored in a non-transitory computer-readable storage medium, for example. Alternatively, the program and/or updates thereto can be downloaded into the storage device or streamed into the information processing apparatus via a wired or wireless connection, if desired.

According to a first aspect, a method to be executed by an information processing apparatus to cause a neural network having sequentially learned first to (T−1)-th tasks (where T is an integer of two or more) sequentially using first to (T−1)-th training sets to learn a T-th task using a T-th training set is provided. The neural network includes a plurality of layers, and the plurality of layers each include a plurality of units, the plurality of units each have a weight coefficient associated with each input to a unit, and an importance parameter indicating importance of the weight coefficient. The method includes: in learning of the T-th task, adjusting a first weight coefficient based on the importance parameter of the first weight coefficient and a first gradient of the first weight coefficient determined using the T-th training set; and after the learning with the T-th training set has been completed, determining, based on the T-th training set, respective second gradients of a plurality of second weight coefficients included in a first layer including the first weight coefficient among the plurality of layers, wherein the plurality of second weight coefficients include the first weight coefficient, and calculating the importance parameter of the first weight coefficient to be used in learning of a (T+1)-th task based on the respective second gradients of the plurality of second weight coefficients.

The adjusting of the first weight coefficient may include: calculating a third gradient by adjusting the first gradient of the first weight coefficient determined using the T-th training set based on the importance parameter of the first weight coefficient; and adjusting the first weight coefficient based on the third gradient, and the third gradient has a smaller absolute value than the first gradient, and higher the importance of the first weight coefficient indicated by the importance parameter of the first weight coefficient is, greater a difference between the third gradient and the first gradient is.

The calculating the importance parameter of the first weight coefficient to be used in the learning of the (T+1)-th task may include normalizing a second gradient of the first weight coefficient based on the respective second gradients of the plurality of second weight coefficients.

An absolute value of the second gradient of the first weight coefficient may be normalized to a value that is no smaller than zero and smaller than one.

The normalizing the second gradient of the first weight coefficient may include calculating an average and variance of the respective second gradients of the plurality of second weight coefficients.

The importance parameter of the first weight coefficient to be used in the learning of the (T+1)-th task may be a greater one of the normalized second gradient of the first weight coefficient and the importance parameter of the first weight coefficient used in the learning of the T-th task.

The plurality of layers may include first to T-th heads that are for providing outputs of the neural network respectively corresponding to the first to T-th tasks, and the calculating of the importance parameter of the first weight coefficient to be used in the learning of the (T+1)-th task may include: determining respective fourth gradients of the plurality of second weight coefficients in a t-th task (where t is an integer from 1 to T) based on an output from a t-th head based on the T-th training set; normalizing a fourth gradient of the first weight coefficient in the t-th task based on the respective fourth gradients of the plurality of second weight coefficients in the t-th task; and determining a maximum value among the normalized fourth gradients of the first to T-th tasks. Here, the maximum value may be the normalized second gradient of the first weight coefficient.

According to a second aspect, an information processing apparatus includes: one or more processors; and a storage device that stores a program that can be executed by the one or more processors is provided. The storage device further stores, for each of a plurality of units included in each of a plurality of layers of a neural network that has sequentially learned first to (T−1)-th tasks (where T is an integer of two or more) sequentially using first to (T−1)-th training sets, a weight coefficient associated with each input to a unit and an importance parameter indicating importance of the weight coefficient. By executing the program, the one or more processors cause the information processing apparatus to execute learning processing for causing the neural network to learn a T-th task using a T-th training set. The learning processing includes: adjusting a first weight coefficient based on the importance parameter of the first weight coefficient and a first gradient of the first weight coefficient determined using the T-th training set; and after learning with the T-th training set has been completed, determining, based on the T-th training set, respective second gradients of a plurality of second weight coefficients included in a first layer including the first weight coefficient among the plurality of layers, wherein the plurality of second weight coefficients include the first weight coefficient, and calculating the importance parameter of the first weight coefficient to be used in learning of a (T+1)-th task based on the respective second gradients of the plurality of second weight coefficients.

According to a third aspect, a non-transitory computer-readable recording medium storing a program is provided. Upon being executed by one or more processors of an information processing apparatus, the program causes the information processing apparatus to execute learning processing for causing a neural network having sequentially learned first to (T−1)-th tasks (where T is an integer of two or more) using first to (T−1)-th training sets to learn a T-th task using a T-th training set. For each of a plurality of units included in each of a plurality of layers of the neural network, the information processing apparatus has stored therein a weight coefficient associated with each input to a unit and an importance parameter indicating importance of the weight coefficient, The learning processing includes: adjusting a first weight coefficient based on the importance parameter of the first weight coefficient and a first gradient of the first weight coefficient determined using the T-th training set; and after learning with the T-th training set has been completed, determining, based on the T-th training set, respective second gradients of a plurality of second weight coefficients included in a first layer including the first weight coefficient among the plurality of layers, wherein the plurality of second weight coefficients include the first weight coefficient, and calculating the importance parameter of the first weight coefficient to be used in learning of a (T+1)-th task based on the respective second gradients of the plurality of second weight coefficients.

According to a fourth aspect, a system configured to perform the method according to the first aspect or a system including the information processing apparatus according to the second aspect is provided.

While the present disclosure has been described with reference to exemplary embodiments, other embodiments are contemplated as well, in accordance with the principles herein. The scope of the disclosure and following claims is to be accorded the broadest interpretation so as to encompass all such modifications and equivalent structures and functions.

What is claimed is:

1. A method to be executed by an information processing apparatus, the method comprising:

training a neural network having learned first to (T−1)-th tasks (where T is an integer of two or more) sequentially using first to (T−1)-th training sets to learn a T-th task using a T-th training set, wherein the neural network includes a plurality of layers, and the plurality of layers each include a plurality of units, the plurality of units each have a weight coefficient associated with each input to a unit, and an importance parameter indicating importance of the weight coefficient, wherein the training the neural network comprises:

adjusting a first weight coefficient based on the importance parameter of the first weight coefficient and a first gradient of the first weight coefficient that is determined using the T-th training set;

after the learning with the T-th training set has been completed, determining, based on the T-th training set, respective second gradients of a plurality of second weight coefficients included in a first layer among the plurality of layers, wherein the plurality of second weight coefficients include the first weight coefficient, and calculating the importance parameter of the first weight coefficient to be used in learning of a (T+1)-th task based on the respective second gradients of the plurality of second weight coefficients, wherein the plurality of layers include first to T-th heads that are for providing outputs of the neural network respectively corresponding to the first to T-th tasks, wherein the calculating the importance parameter of the first weight coefficient to be used in the learning of the (T+1)-th task comprises:

normalizing a second gradient of the first weight coefficient based on the respective second gradients of the plurality of second weight coefficients; and determining respective fourth gradients of the plurality of second weight coefficients in a t-th task (where t is an integer from 1 to T) based on an output from a t-th head based on the T-th training set;

normalizing a fourth gradient of the first weight coefficient in the t-th task based on the respective fourth gradients of the plurality of second weight coefficients in the t-th task; and determining a maximum value among the normalized fourth gradients of the first to T-th tasks, and wherein the maximum value is the normalized second gradient of the first weight coefficient.

2. The method according to claim 1, wherein the adjusting of the first weight coefficient comprises:

calculating a third gradient by adjusting the first gradient of the first weight coefficient based on the importance parameter of the first weight coefficient; and adjusting the first weight coefficient based on the third gradient, the third gradient has a smaller absolute value than the first gradient, and the higher the importance of the first weight coefficient indicated by the importance parameter of the first weight coefficient is, the greater a difference between the third gradient and the first gradient is.

3. The method according to claim 1, wherein an absolute value of the second gradient of the first weight coefficient is normalized to a value that is not smaller than zero and is smaller than one.

4. The method according to claim 1, wherein the normalizing the second gradient of the first weight coefficient comprises calculating an average and variance of the respective second gradients of the plurality of second weight coefficients.

5. The method according to claim 1, wherein the importance parameter of the first weight coefficient to be used in the learning of the (T+1)-th task is a greater one of the normalized second gradient of the first weight coefficient and the importance parameter of the first weight coefficient used in the learning of the T-th task.

6. An information processing apparatus comprising:

one or more processors; and a storage device, operatively connected to the one or more processors, that stores a program that can be executed by the one or more processors, wherein the storage device further stores, for each of a plurality of units included in each of a plurality of layers of a neural network that has sequentially learned first to (T−1)-th tasks (where T is an integer of two or more) sequentially using first to (T−1)-th training sets, a weight coefficient associated with each input to a unit and an importance parameter indicating importance of the weight coefficient, by executing the program, the one or more processors cause the information processing apparatus to execute training processing for causing the neural network to learn a T-th task using a T-th training set, and the training processing comprises:

adjusting a first weight coefficient based on the importance parameter of the first weight coefficient and a first gradient of the first weight coefficient that is determined using the T-th training set; and after learning with the T-th training set has been completed, determining, based on the T-th training set, respective second gradients of a plurality of second weight coefficients included in a first layer among the plurality of layers, wherein the plurality of second weight coefficients include the first weight coefficient, and calculating the importance parameter of the first weight coefficient to be used in learning of a (T+1)-th task based on the respective second gradients of the plurality of second weight coefficients, wherein the plurality of layers include first to T-th heads that are for providing outputs of the neural network respectively corresponding to the first to T-th tasks, and wherein the calculating the importance parameter of the first weight coefficient to be used in the learning of the (T+1)-th task comprises:

normalizing a second gradient of the first weight coefficient based on the respective second gradients of the plurality of second weight coefficients;

determining respective fourth gradients of the plurality of second weight coefficients in a t-th task (where t is an integer from 1 to T) based on an output from a t-th head based on the T-th training set;

normalizing a fourth gradient of the first weight coefficient in the t-th task based on the respective fourth gradients of the plurality of second weight coefficients in the t-th task; and determining a maximum value among the normalized fourth gradients of the first to T-th tasks, and wherein the maximum value is the normalized second gradient of the first weight coefficient.

7. A non-transitory computer-readable recording medium storing a program, wherein upon being executed by one or more processors of an information processing apparatus, the program causes the information processing apparatus to execute training processing for causing a neural network having sequentially learned first to (T−1)-th tasks (where T is an integer of two or more) using first to (T−1)-th training sets to learn a T-th task using a T-th training set, for each of a plurality of units included in each of a plurality of layers of the neural network, the information processing apparatus has stored therein a weight coefficient associated with each input to a unit and an importance parameter indicating importance of the weight coefficient, and the training processing comprises:

adjusting a first weight coefficient based on the importance parameter of the first weight coefficient and a first gradient of the first weight coefficient that is determined using the T-th training set; and after learning with the T-th training set has been completed, determining, based on the T-th training set, respective second gradients of a plurality of second weight coefficients included in a first layer among the plurality of layers, wherein the plurality of second weight coefficients include the first weight coefficient, and calculating the importance parameter of the first weight coefficient to be used in learning of a (T+1)-th task based on the respective second gradients of the plurality of second weight coefficients, wherein the plurality of layers include first to T-th heads that are for providing outputs of the neural network respectively corresponding to the first to T-th tasks, and wherein the calculating the importance parameter of the first weight coefficient to be used in the learning of the (T+1)-th task comprises:

normalizing a second gradient of the first weight coefficient based on the respective second gradients of the plurality of second weight coefficients;

determining respective fourth gradients of the plurality of second weight coefficients in a t-th task (where t is an integer from 1 to T) based on an output from a t-th head based on the T-th training set;

normalizing a fourth gradient of the first weight coefficient in the t-th task based on the respective fourth gradients of the plurality of second weight coefficients in the t-th task; and determining a maximum value among the normalized fourth gradients of the first to T-th tasks, and wherein the maximum value is the normalized second gradient of the first weight coefficient.

8. A system configured to perform the method of claim 1.

* * * * *